United States Patent
Shah et al.

(10) Patent No.: US 6,593,002 B2
(45) Date of Patent: Jul. 15, 2003

(54) TIE-LAYER FORMULATION AND METHOD OF MANUFACTURE

(75) Inventors: Suresh D. Shah, Troy, MI (US); Nicole M. Mahmood, New Carlisle, OH (US); Srimannarayana Kakarala, Bloomfield Hills, MI (US)

(73) Assignee: Delphi Technologies, inc., Troy, MI (US)

( * ) Notice: Subject to any disclaimer, the term of this patent is extended or adjusted under 35 U.S.C. 154(b) by 0 days.

(21) Appl. No.: 09/911,057

(22) Filed: Jul. 23, 2001

(65) Prior Publication Data

US 2003/0017329 A1 Jan. 23, 2003

(51) Int. Cl.⁷ ................................................ B32B 27/32
(52) U.S. Cl. ................ 428/500; 428/343; 428/355 EN; 428/423.1; 428/424.2; 428/424.4; 428/424.8
(58) Field of Search ................ 428/343, 355 EN, 428/423.1, 424.2, 424.4, 424.8, 500

(56) References Cited

U.S. PATENT DOCUMENTS

| | | | |
|---|---|---|---|
| 4,910,085 A | * 3/1990 | Raniere et al. | 428/412 |
| 5,206,294 A | 4/1993 | Dawson | 525/196 |
| 5,695,870 A | * 12/1997 | Kelch et al. | 428/317.1 |
| 5,721,314 A | 2/1998 | Hausmann | 525/71 |
| 5,783,016 A | 7/1998 | Gallagher et al. | |
| 5,883,188 A | * 3/1999 | Hwang et al. | 428/523 |
| 6,153,680 A | 11/2000 | Shah et al. | 524/425 |
| 6,306,503 B1 | * 10/2001 | Tsai | 428/412 |
| 6,358,599 B1 | * 3/2002 | Deibel et al. | 428/220 |

FOREIGN PATENT DOCUMENTS

| | | |
|---|---|---|
| EP | 0506348 | 9/1992 |
| EP | 0636473 | 2/1995 |
| WO | 9919399 | 4/1998 |

OTHER PUBLICATIONS

M.K.H. Hausmann et. al. "Procedes ETP—TPO Pour Planche De Bord ETP—TPO Processes for Dashbords" Ingenieurs De L'Automobile, RAIP Boulogne, FR, No. 704, Apr. 1, 1996, pp. 62–64, XP000584284.

\* cited by examiner

*Primary Examiner*—James J. Seidleck
*Assistant Examiner*—Melanie Bissett
(74) *Attorney, Agent, or Firm*—Kathryn A. Marra

(57) ABSTRACT

A multi layer thermoplastic polymer alloy is provided. The multi layer alloy includes a skin of thermoplastic polymer alloy having non-polar segments and a tie-layer having non-polar segments and polar functional groups. The non-polar segments of the tie-layer are bondable with the non-polar segments of the thermoplastic polymer alloy skin. Similarly, the polar functional groups of the tie-layer are bondable or reactable with a surface layer.

18 Claims, 6 Drawing Sheets

TIE-LAYER FORMULATION AND METHOD OF MANUFACTURE

TECHNICAL FIELD

This application relates to multi layer thermoplastic polymer alloy compositions including one or more tie-layers. This application further relates to methods of manufacturing such multi layer thermoplastic polymer alloy compositions.

BACKGROUND

Thermoplastic polymer alloy compositions have been developed to replace polyvinyl chloride for the fabrication of many articles. In the automotive field, thermoplastic polymer alloy (hereinafter TPA) compositions have been used for the fabrication of articles such as interior sheathing, including instrument panel skins, door panels, air bag covers, roof liners, and seat covers. In these applications, the interior sheathing includes a sheet or skin (hereinafter skin) made of the TPA composition.

The bottom surface of the skin is commonly adhered to a layer of foam padding, typically urethane foam. Similarly, the top surface of the skin is commonly painted to provide a desired appearance and scuff resistance. Prior to applying either the layer of foam or paint, the top and bottom surfaces of the skin are primed to increase adhesion with the foam and/or the paint.

The layer of foam padding is adhered to the skin by, for example, a foam-in-place process. During such a foam-in-place process, the skin is placed on mold cavity of a molding tool and the foam is introduced into the molding tool to fill the gap between the skin and a plastic retainer which is pre-inserted into the mold core.

SUMMARY

A multi layer thermoplastic polymer alloy is provided. The multi layer alloy includes a skin of thermoplastic polymer alloy having non-polar segments and a tie-layer having non-polar segments and polar functional groups. The non-polar segments of the tie-layer are bondable with the non-polar segments of the thermoplastic polymer alloy skin. Similarly, the polar functional groups of the tie-layer are bondable or reactable with a surface layer.

An interior sheathing for a vehicle is provided. The sheathing includes a multi-layer skin having a first layer and a second layer, and a layer of urethane foam. The first layer of the multi-layer skin is a layer of thermoplastic polymer alloy. The second layer of the multi-layer skin is a tie-layer. The thermoplastic polymer alloy layer has non-polar segments on a first side and a second side. The tie-layer has non-polar segments and polar functional groups. The non-polar segments of the tie-layer are bonded with the non-polar segments of the first side of the thermoplastic polymer alloy. The polar functional groups of the tie-layer are bonded to or reacted with the layer of urethane foam.

A method of forming a multi layer thermoplastic polymer alloy is provided. The method includes providing a thermoplastic polymer alloy skin, providing a tie-layer, disposing the tie-layer on a lower surface of the thermoplastic polymer alloy skin, and exposing the thermoplastic polymer alloy skin and the tie-layer to heat and pressure. The thermoplastic polymer alloy skin has non-polar segments. The tie-layer has non-polar segments and polar functional groups. The non-polar segments of the tie-layer are bondable with the non-polar segments of said thermoplastic polymer alloy skin. Similarly, the polar functional groups of the tie-layer are bondable or reactable with a layer of foam.

The above-described and other features and advantages of the present application will be appreciated and understood by those skilled in the art from the following detailed description, drawings, and appended claims.

DESCRIPTION OF THE PREFERRED EMBODIMENT

Some TPA skins are painted (e.g., paintable skins) before forming the interior sheathing. The painting process is labor intensive and accordingly adds to the overall manufacturing costs (e.g. labor, equipment and materials). The painting process includes applying a primer on a bottom surface of the skin, heat curing, applying a primer on a top surface of the skin, heat curing again, applying a paint coat and heat curing again. The primer on the top surface aids with adhesion of the paint coat to the skin, while the layer of primer on the bottom surface aids with adhesion of the layer of foam to the skin.

Paintable skins are commonly a blend of polypropylene, ethylene copolymer ionomer resin, ethylene glycidyl acrylate or methacrylate copolymer, and uncrosslinked ethylene propylene rubber. Alternately, paintable skins are a blend of polypropylene, ethylene copolymer ionomer resin, ethylene glycidyl acrylate or methacrylate copolymer, uncrosslinked ethylene propylene rubber, acid or anhydride grafted polypropylene, an agent for crosslinking the rubber and/or catalyzing an epoxide/acid reaction, and optionally, a poly-.alpha.-olefin.

Other TPA skins do not require painting (e.g., paintless skins). However, such paintless skins still require a primer on the bottom surface to aid adhesion with the layer of foam. These skins do not require further priming and painting of the top surface since the paintless skin provides the desired appearance and scuff and scratch resistance. The primer on the bottom surface of the skin aids with adhesion of the layer of urethane foam to the skin. The priming process, similar to painting process described above, is labor intensive and accordingly adds to the overall manufacturing costs (e.g. labor, equipment, and materials).

Paintless skins are commonly a blend of polypropylene, uncrosslinked ethylene copolymer, ionomeric copolymer of ethylene and .alpha.,.beta.-unsaturated $C_3$–$C_8$ carboxylic acid, crosslinking agent, silicone elastomer, and may further comprise particulate filler, color concentrate and/or coloring pigment.

Figure 1:
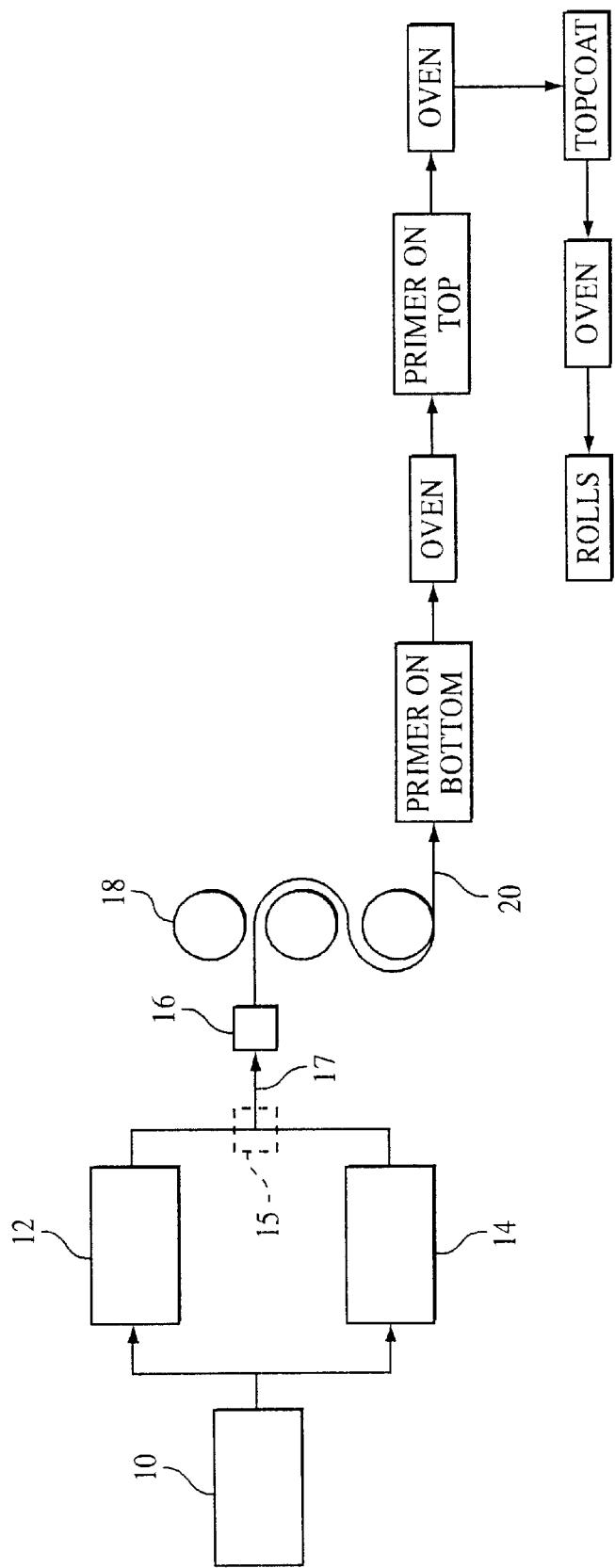
FIG. 1 is a schematic depiction of a paintable skin manufacturing process.

Referring now to the Figures and in particular to FIG. 1, a schematic depiction of a paintable skin manufacturing process is illustrated. In this process, components of the TPA are melt blended and pelletized to form pellets in precompounding extruder 10 to form pellets. In a separate step, the formed pellets are coextruded with, for example, color pigment, through extruders 12 and extruder 14.

The extrudate 17 is passed through die 16 and embossing rollers 18 to form a skin 20. Here, die 16 is a manifold die. Alternately and as shown in phantom, extrudate 17 is passed through a feed block 15, then through die 16 and embossing rollers 18 to form skin 20.

In order to provide the desired appearance and scuff and scratch resistance to skin 20 and in order to provide the skin with the desired adhesion capabilities to the foam, the skin is primed and painted. A primer 22 is applied to a bottom surface 24 of skin 20 followed by heating in an oven. A primer 26 is then applied to a top surface 28 of skin 20 followed by heating in an oven. Following application of the primer coats 22 and 26, a topcoat of paint 30 is applied to top surface 28 of skin 20, followed again by heating. Skin 20 is then transferred to rolls for forming articles therefrom.

Figure 2:
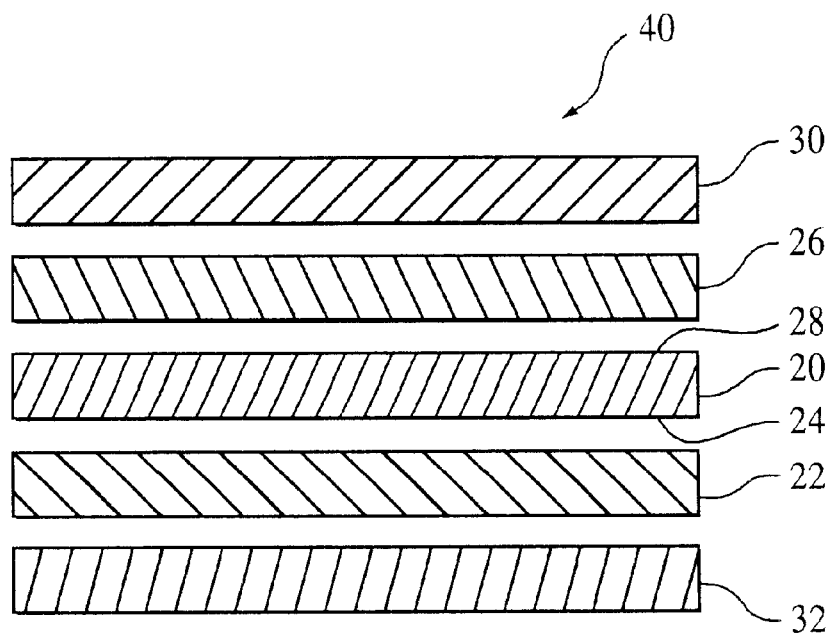
FIG. 2 is a cross sectional view of an interior sheathing using the paintable skin manufactured according to FIG. 1.

An example of skin 20 used in the manufacture of an interior sheath 40 is illustrated in FIG. 2. In this example, the rolls are then transferred to a foam-in-place process where a layer of foam 32 is integrated with skin 20 at primer 22. Thus, primer 22 of skin 20 promotes adhesion of the skin with paint 30 and foam 32.

Figure 3:
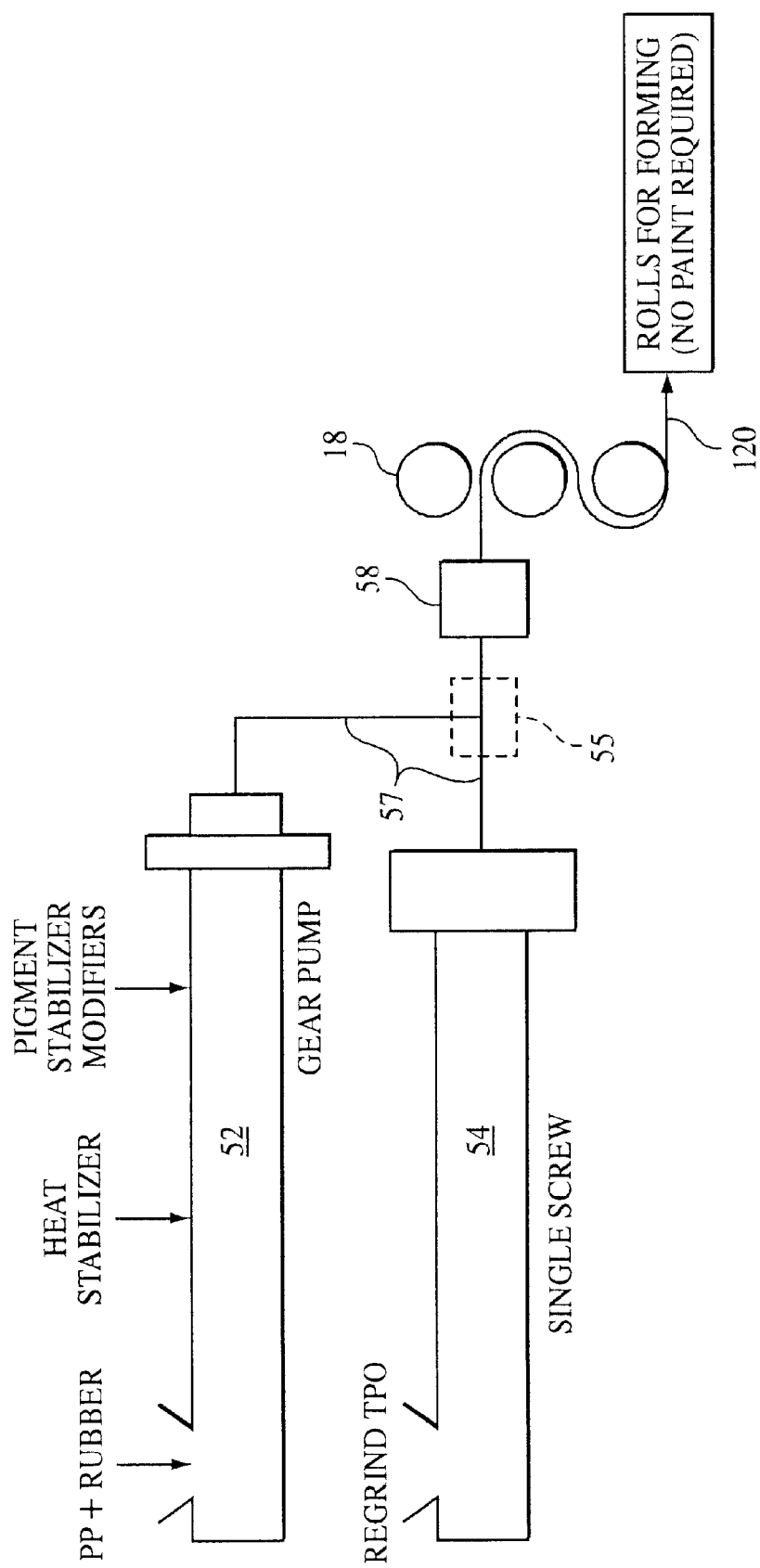
FIG. 3 is a schematic depiction of a paintless skin manufacturing process.

Similarly, FIG. 3 is a schematic depiction of two alternate embodiments of a paintless skin manufacturing process. In a first embodiment, the TPA is compounded and co-extruded through extruder 52 and extruder 54. Here, extruder 52 uses virgin or new material to form a cap layer, while extruder 54 uses regrind or recycled material to form a base layer. In a second embodiment, the TPA is compounded and co-extruded only with virgin material through extruder 52.

In either embodiment, extrudate 57 is passed from extruder 52 and optionally extruder 54 through layer die 58 and through embossing rollers 18 to form skin 120. Here, die 58 is a manifold die. Alternately and as shown in phantom, extrudate 57 is passed through a feed block 55, then through die 58 and embossing rollers 18 to form skin 120.

Skin 120 is transferred to rolls for forming articles of manufacture therefrom. Due to the inherent properties of the TPA, skin 120 provides the desired level of appearance and scuff and scratch resistance. Hence, skin 120 is a paintless skin.

Figure 4:
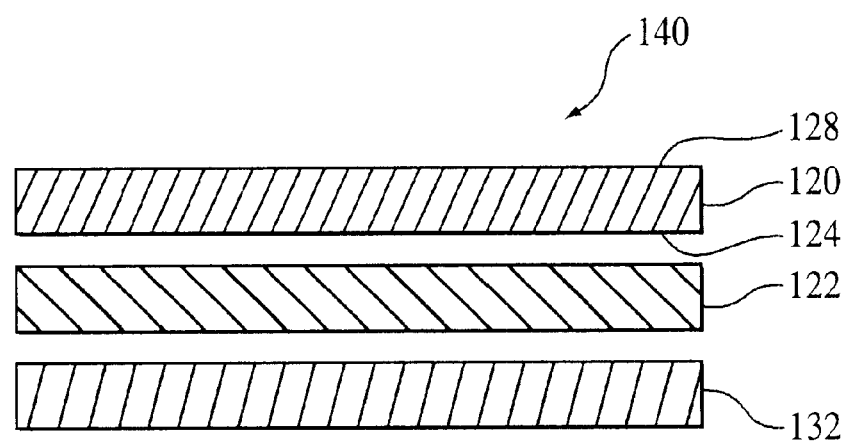
FIG. 4 is a cross sectional view of an interior sheathing using the paintless skin manufactured according to FIG. 3.

An example of skin 120 used in the manufacture of an interior sheath 140 is illustrated in FIG. 4. In this embodiment, skin 120 includes a bottom surface 124 and a top surface 128. As discussed above, top surface 128 imparts sufficient color and wear characteristics to skin 120 so as to eliminate the need for expensive, time consuming priming steps for the top surface of the skin. However, a primer 122 is required at bottom surface 124 to promote the adhesion of skin 120 and a layer of foam 132. Thus, skin 120 is provided to a foam-in-place process where layer of foam 132 is adhered to skin 120 at primer 122.

It has been determined that a thin tie-layer can be added to skin 20 or 120 to form a multi-layer skin to eliminate the priming steps described above. Thus, skin 20 or 120 is provided with a multi-layer format that includes not only the skin, but also the tie-layer(s). In the use of paintable skin 20, the tie-layer is disposed on the top and bottom of the skin where it is needed to aid with adhesion of a layer of foam and a layer of paint. However, in the use of paintless skin 120, the tie-layer is disposed only on the bottom of the skin where it is needed to aid with adhesion of the layer of foam.

The tie-layer has dual functionality, namely it includes a high molecular weight polymeric chain that has non-polar segments, which bond with the non-polar segments of skin 20 or 120, and it includes polar functional groups, which can either bond or react with the paint or layer of foam.

Accordingly, skin 20 or 120 with the tie-layer(s) eliminates the need for expensive, time consuming priming steps for the top and bottom surfaces of the skin. In the embodiment using paintable skin 20, the incorporation of a top tie-layer and a bottom tie-layer eliminates the need for priming the top and the bottom sides of the skin. However in the embodiment using paintless skin 120, the incorporation of the tie-layer is only needed at the bottom of the skin and eliminates the need for priming the bottom.

The tie-layer is a thin layer of a copolymer that is adapted to function as an adhesion promoter. More specifically, the tie-layer is a layer having a thickness between about 0.001 inches and about 0.01 inches disposed on the top surface and bottom surface of skin 20, or disposed on the bottom surface of skin 120, where the skin 20 and 120 has a thickness of about 0.04 inches. Preferably, the tie-layer has a thickness between about 0.001 inches and about 0.002 inches.

Of course, it should be recognized that as other applications require skin 20 and 120 and/or the tie-layer having thickness larger or smaller than described above are considered within the scope of the present invention The tie-layer includes a polymeric chain that bonds with skins 20 and 120. Moreover, in the application where skins 20 and 120 are used in conjunction with a urethane foam layer and/or a layer of paint, the tie-layer includes a polymeric chain that bonds or reacts with the urethane foam and/or the layer of paint.

In a first embodiment, the tie-layer is a styrenic copolymer such as, but not limited to, ethylene-styrene copolymers, generic acid copolymer and terpolymers, and vinyl acetate copolymers. In an alternate embodiment, the tie-layer is a copolymer having a reactive functional (di-function or tri-function) group. For example, the tie-layer is a copolymer having a reactive functional group such as, but not limited to, hydroxyl, maleic anhydride, amine, ionomer, urethane, isocyanate functional groups and epoxy. In a preferred embodiment, the tie-layer is maleic anhydride functionalized styrenic block copolymers and terpolymers. Accordingly, the tie-layer eliminates the need for expensive, time consuming priming steps for the top and bottom surfaces of skin 20 and for the bottom surface of skin 120.

The tie-layer is disposed on the top and bottom surface of skin 20 and is disposed on the bottom surface of skin 120 by means such as, but not limited to co-extrusion, lamination, roller coating, spray coating and the like.

Figure 5:
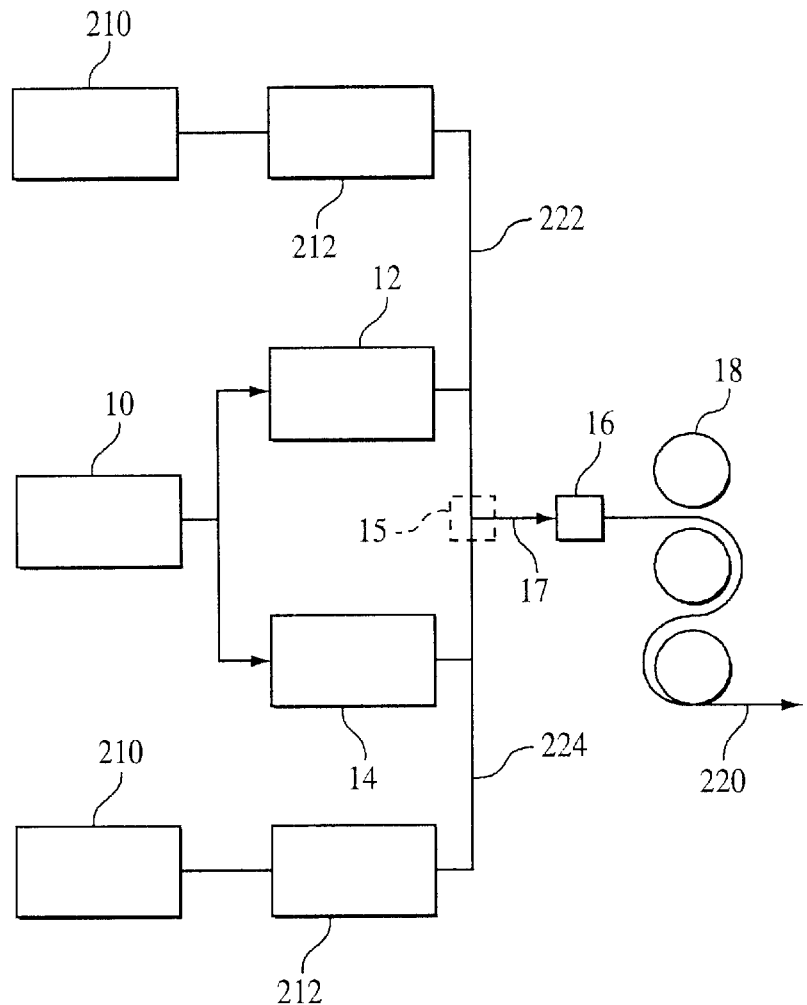
FIG. 5 is a schematic depiction of an exemplary embodiment of a multi-layer skin manufacturing process for co-extruding top and bottom tie-layers.

Referring now to FIG. 5, an exemplary embodiment of a co-extrusion process for a multi-layer skin 220 having the tie-layer described above and paintable skin 20 is illustrated.

In this embodiment, multi-layer skin 220 includes paintable skin 20 co-extruded with a top tie-layer 222 and a bottom tie-layer 224.

As described above with respect to FIG. 1, the components of skin 20 are precompounded in extruder 10 to form pellets. Additionally, the components of tie-layers 222 and 224 are precompounded in separate precompounding extruders 210 to form pellets. In a separate step, the formed pellets are co-extruded through extruders 12, 14 and 212, respectively.

The extrudate 17, which includes skin 20 and tie-layers 222 and 224, is passed through die 16 and embossing rollers 18 to form multi-layer skin 220 consisting of skin 20, tie-layer 222, and tie-layer 224. Here, die 16 is a manifold die. Alternately and as shown in phantom, extrudate 17 is passed through a feed block 15, then through die 16 and embossing rollers 18 to form skin 220.

Apart from the chemical bond formed between tie layers 222 and 224 and skin 20, a mechanical bond is formed as a result of the heat and pressure multi-layer skin 220 is subjected to during processing by die 16 and embossing rollers 18.

It should be recognized that co-extrusion of tie-layers 222 and 224 with skin 20 is an example of the formation of multi-layer skin 220. Of course, and as other applications require, tie-layers 222 and 224 are disposed on skin 20 by other methods. For example, tie-layers 222 and 224 disposed on the top and bottom surface of skin 20 by means such as, but not limited to lamination, roller coating, spray coating and the like are considered within the scope of the present invention.

Figure 6:
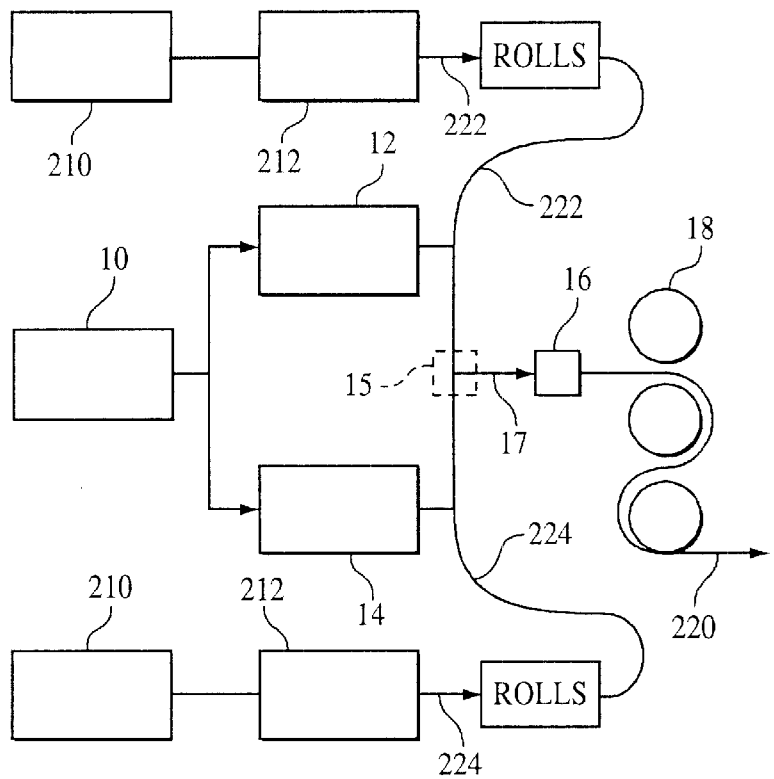
FIG. 6 is a schematic depiction of an alternate exemplary embodiment of a multi-layer skin manufacturing process for laminating top and bottom tie-layers.

Referring now to FIG. 6, an exemplary embodiment of a laminating process for multi-layer skin 220 is illustrated. Here, tie-layer 222 and tie-layer 224 are formed into rolls separate from the extrusion of skin 20. Tie-layers 222 and 224 are then fed into die 16 (or feed block 15 and then die 16) concurrent with the extrusion of extrudate 17 (e.g., skin 20) from extruders 12 and 14. Again, apart from the chemical bond formed between tie layers 222 and 224 and skin 20, a mechanical bond is formed as a result of the heat and pressure multi-layer skin 220 is subjected to during processing by die 16 and embossing rollers 18.

Figure 7:
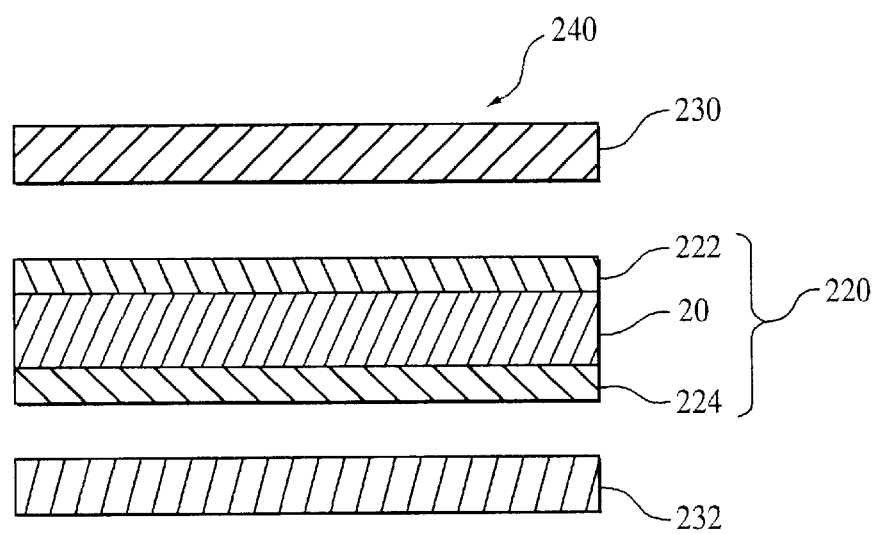
FIG. 7 is a cross sectional view of an interior sheathing using the multi-layer skin manufactured according to FIG. 5 or 6.

Referring now to FIG. 7, an interior sheath 240 of multi-layer skin 220 is illustrated. Here, top tie-layer 222 is adapted to bond or react with a coat of paint 230 and bottom tie-layer 224 is adapted to bond or react with a foam layer 232. Of course, it should be recognized that top tie-layer 222 being of either the same material as bottom tie-layer, or of differed material from that of bottom tie-layer 224 are considered within the scope of the present invention. Accordingly, it is seen that multi-layer skin 220 having top tie-layer 222 and bottom tie-layer 224 disposed on skin 20 eliminates the need for expensive, time consuming priming steps for the top and bottom surfaces.

Figure 8:
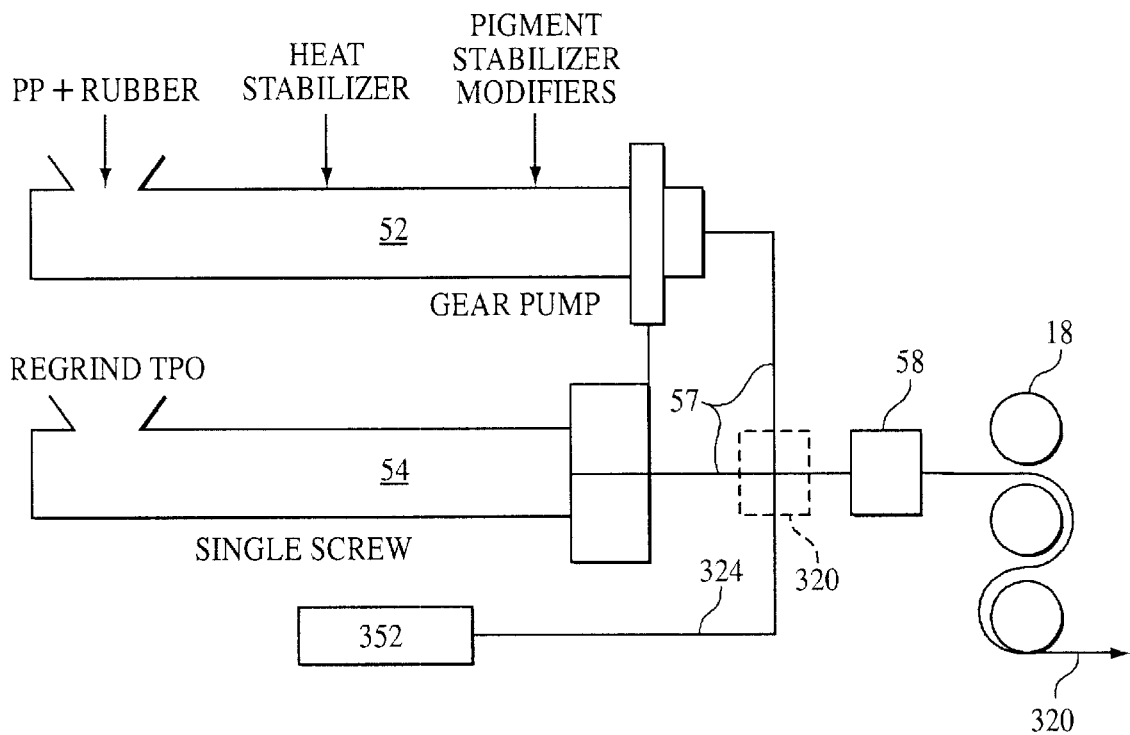
FIG. 8 is a schematic depiction of an alternate exemplary embodiment of a multi-layer skin manufacturing process for co-extruding a bottom tie-layer.

Referring now to FIG. 8, an exemplary embodiment of a co-extrusion process for a multi-layer skin 320 incorporating the tie-layer described above and paintless skin 120 is illustrated. Multi-layer skin 320 includes paintless skin 120 having a bottom tie-layer 324.

As described above with respect to FIG. 3, the components of skin 120 are compounded and co-extruded through either extruders 52 and 54 (e.g., cap of virgin material and a base of regrind material) or extruder 52 only (e.g., skin 120 of complete virgin material). The components of tie-layer 324 are compounded in extruder 352.

In either embodiment, extrudate 57, which includes tie-layer 324, is passed from extruders 52, 54, and 352 through layer die 58 and through embossing rollers 18 to form multi-layer skin 320. Here, die 58 is a manifold die. Alternately and as shown in phantom, extrudate 57 is passed through a feed block 55, then through die 58 and embossing rollers 18 to form skin 120.

Apart from the chemical bond formed between tie layer 324 and skin 120, a mechanical bond is formed as a result of the heat and pressure multi-layer skin 320 is subjected to during processing by die 58 and embossing rollers 18.

Figure 9:
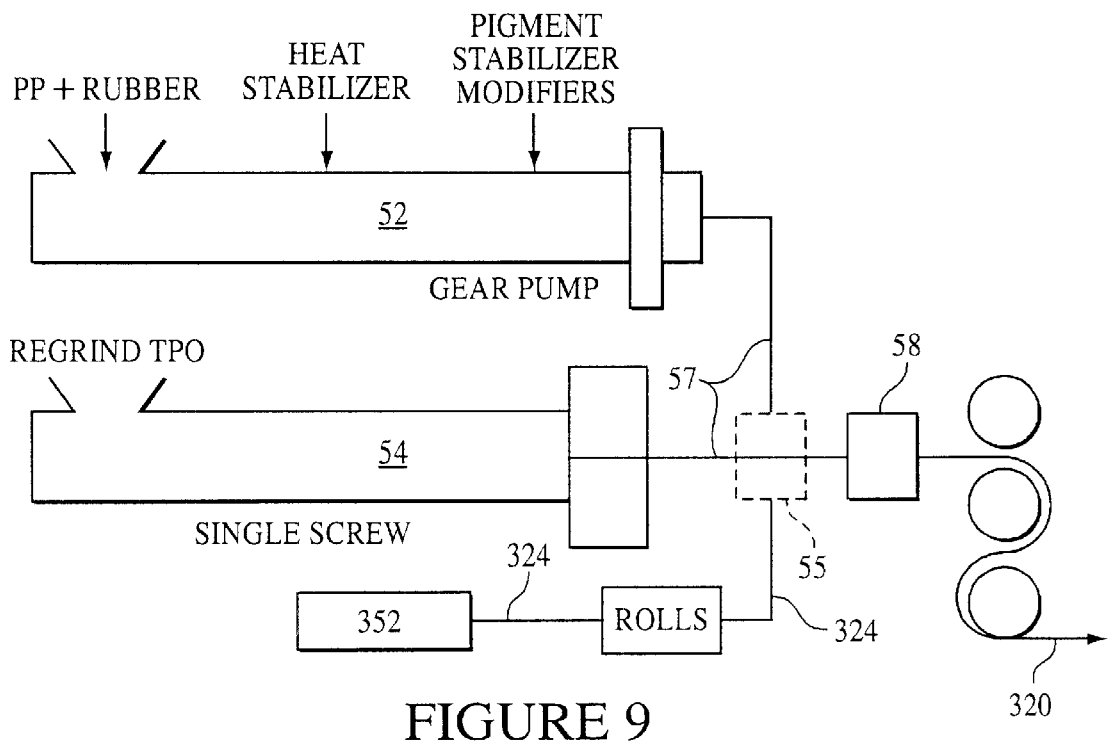
FIG. 9 is a schematic depiction of an alternate exemplary embodiment of a multi-layer skin manufacturing process for laminating a bottom tie-layer.

Referring now to FIG. 9, an exemplary embodiment of a laminating process for multi-layer skin 320 is illustrated. Here, tie-layer 324 is formed into rolls separate from the extrusion of skin 120. Tie-layer 324 is then fed into die 58 (or feed block 55 and then die 58) concurrent with the extrusion of extrudate 57 (e.g., skin 120) from extruders 52 and 54 (or only extruder 52). Again, apart from the chemical bond formed between tie layer 324 and skin 120, a mechanical bond is formed as a result of the heat and pressure multi-layer skin 320 is subjected to during processing by die 58 and embossing rollers 18.

It should be recognize that disposal of the tie-layer on the bottom surface of skin 120 is described above by way of example as a co-extrusion or a lamination process. Of course, and as other applications require the tie-layer is disposed on the bottom surface of skin 120 by means such as, but not limited to roller coating, spray coating, and the like.

Figure 10:
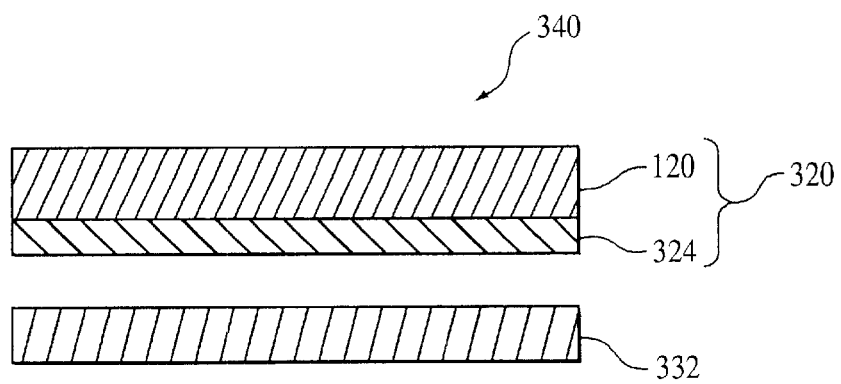
FIG. 10 is a cross sectional view of an interior sheathing using the multi-layer skin manufactured according to FIG. 8 or 9.

Referring now to FIG. 10, multi-layer skin 320 used in an interior sheath 340 is illustrated. Here, bottom tie-layer 324 is adapted to bond or react with a foam layer 332. Accordingly, it is seen that multi-layer skin 320 having bottom tie-layer 324 disposed on skin 120 eliminates the need for expensive, time consuming priming steps for the bottom surface.

By way of example, adhesion between the skin and the foam layer is tested using a peel test, where the skin is peeled from the foam at an angle of 180°. The adhesion is deemed acceptable if the foam layer splits or tears when pulled away from the skin (e.g., some of the foam remains adhered to the skin). Such peel tests are often performed after exposure to temperature cycles commonly experienced by automotive interiors. Thus, tie-layer 224 and 324 provides adhesion to foam layer 232 and 332 sufficient to meet and exceed such post exposure cycling peel tests.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multi layer thermoplastic polymer alloy comprising:
   a skin of thermoplastic polymer alloy having non-polar segments;
   a surface layer selected from a layer of paint, a layer of urethane foam, and a combination of paint and urethane foam; and
   a tie-layer having non-polar segments and polar functional groups, said non-polar segments of said tie-layer being bondable with said non-polar segments of said thermoplastic polymer alloy skin, and said polar functional groups of said tie-layer being bondable or reactable with said surface layer, wherein said tie-layer comprises a styrenic copolymer, said styrenic copolymer comprising an ethylene-styrene copolymer, a generic acid copolymer, a generic acid terpolymer, a vinyl acetate copolymer, or a combination thereof.

2. The multi layer thermoplastic polymer alloy of claim 1, wherein said skin of thermoplastic polymer alloy is a paintable skin.

3. The multi layer thermoplastic polymer alloy of claim 1, wherein said skin of thermoplastic polymer alloy is a paintless skin.

4. The multi layer thermoplastic polymer alloy of claim 3, wherein said surface layer is a layer of urethane foam.

5. The multi layer thermoplastic polymer alloy of claim 1, wherein said skin of thermoplastic polymer alloy has a thickness of about 0.04 inches and said tie-layer has a thickness between about 0.001 inches and about 0.01 inches.

6. The multi layer thermoplastic polymer alloy of claim 1, wherein said tie-layer is a copolymer having a reactive functional group selected from the group consisting of hydroxyl, maleic anhydride, amine, ionomer, urethane, isocyanate functional groups and epoxy.

7. The multi layer thermoplastic polymer alloy of claim 1, wherein said copolymer is maleic anhydride functionalized styrenic block copolymers and terpolymers.

8. A multi layer thermoplastic polymer alloy, comprising:
a surface layer selected from a group consisting of a layer of paint and a layer of urethane foam;
a skin of thermosplastic polymer alloy having non-polar segments; and
a tie-layer having non-polar segments and polar functional groups, said non-polar segments of said tie-layer being bondable with said non-polar segments of said thermoplastic polymer alloy skin, and said polar functional groups of said tie-layer being bondable or reactable with the surface layer, wherein said skin of thermoplastic polymer alloy is a paintable skin including a top and bottom surface, said tie-layer being disposed on said top surface and said bottom surface.

9. The multi layer thermoplastic polymer alloy of claim 8, wherein said tie-layer disposed at said top surface is bondable or reactable with said layer of paint and said tie-layer disposed at said bottom surface is bondable or reactable with said layer of foam.

10. The multi layer thermoplastic polymer alloy of claim 9, wherein said tie-layer disposed at said top surface is the same as said tie-layer disposed at said bottom surface.

11. The multi layer thermoplastic polymer alloy of claim 4, wherein said paintless skin includes a bottom surface, said tie-layer being disposed on said bottom surface.

12. An interior sheathing for a vehicle, comprising:
a multi-layer skin having a first layer and a second layer; said first layer being a layer of thermoplastic polymer alloy having non-polar segments on a first side and a second side, said second layer being a tie-layer having non-polar segments and polar functional groups, said non-polar segments of said tie-layer being bonded with said non-polar segments of said first side of said thermoplastic polymer alloy; and
a layer of urethane foam, said polar functional groups of said tie-layer being bonded to or reacted with said layer of urethane foam, wherein said tie-layer comprises a styrenic copolymer, said styrenic copolymer comprising an ethylene-styrene copolymer, a generic acid copolymer, a generic acid erpolymer, a vinyl acetate copolymer, or a combination thereof.

13. The interior sheathing of claim 12, wherein said first layer has a thickness of about 0.04 inches and said second layer has a thickness between about 0.001 inches and about 0.002 inches.

14. The interior sheathing of claim 12, wherein said tie-layer is a copolymer having a reactive functional group selected from the group consisting of hydroxyl, maleic anhydride, amine, ionomer, urethane, isocyanate functional groups and epoxy.

15. The interior sheathing of claim 12, wherein said layer of thermoplastic polymer alloy is selected from the group consisting of paintable skins and paintless skins.

16. An interior sheathing for a vehicle, comprising:
a multi-layer skin having a first layer and a second layer, said first layer being a layer of thermoplastic polymer alloy having non-polar segments on a first side and a second side, said second layer being a tie-layer having non-polar segments and polar functional groups, said non-polar segments of said tie-layer being bonded with said non-polar segments of said first side of said thermoptastic polymer alloy;
a layer of urethane foam, said polar functional groups of said tie-layer being bonded to or reacted with said layer of urethane foam;
a third layer of said multi-layer skin, wherein said third layer is a second tie-layer having non-polar segments and polar functional groups, said second tie-layer being bonded to said second side of said first layer by said non-polar segments; and
a layer of paint, said polar functional groups of said second tie-layer being bonded to or reacted with said layer of paint.

17. An interior sheathing for a vehicle, comprising:
a multi-layer skin having a first layer and a second layer, said first layer being a layer of thermoplastic polymer alloy having non-polar segments on a first side and a second side, said second layer being a tie-layer having non-polar segments and polar functional groups, said non-polar segments of said tie-layer being bonded with said non-polar segments of said first side of said thermoplastic polymer alloy, wherein said tie-layer is a styrenic copolymer selected from the group consisting of ethylene-styrene copolymers, generic acid copolymer and terpolymers, and vinyl acetate copolymers; and
a layer of urethane foam, said polar functional groups of said tie-layer being bonded to or reacted with said layer of urethane foam.

18. The interior sheathing of claim 17, wherein said copolymer is maleic anhydride functionalized styrenic block copolymers and terpolymers.

* * * * *